US012280427B2

(12) United States Patent
Takano et al.

(10) Patent No.: US 12,280,427 B2
(45) Date of Patent: Apr. 22, 2025

(54) LAMINATION MOLDING APPARATUS, MOLDING STATE ESTIMATION SYSTEM, MOLDING STATE ESTIMATION METHOD, MOLDING STATE ESTIMATION PROGRAM, AND LEARNING METHOD OF LEARNING MODEL FOR MOLDING STATE ESTIMATION

(71) Applicant: Sodick Co., Ltd., Kanagawa (JP)

(72) Inventors: Masahiro Takano, Kanazawa (JP);
Yuta Yoshida, Kanazawa (JP);
Hiroyasu Miyakawa, Kanazawa (JP);
Shuji Okazaki, Yokohama (JP); Ichiro Araie, Yokohama (JP); Yasuyuki Miyashita, Yokohama (JP)

(73) Assignee: Sodick Co., Ltd., Yokohama (JP)

( * ) Notice: Subject to any disclaimer, the term of this patent is extended or adjusted under 35 U.S.C. 154(b) by 82 days.

(21) Appl. No.: 17/480,557

(22) Filed: Sep. 21, 2021

(65) Prior Publication Data
US 2022/0118520 A1    Apr. 21, 2022

(30) Foreign Application Priority Data
Oct. 20, 2020    (JP) .................... 2020-176102

(51) Int. Cl.
*B33Y 30/00*    (2015.01)
*B22F 10/80*    (2021.01)
(Continued)

(52) U.S. Cl.
CPC .............. *B22F 10/80* (2021.01); *B22F 12/41* (2021.01); *B33Y 30/00* (2014.12); *B33Y 50/00* (2014.12);
(Continued)

(58) Field of Classification Search
CPC ...... B22F 10/80; B22F 12/41; B22F 2999/00; B22F 10/30; B22F 10/36; B22F 10/364;
(Continued)

(56) References Cited

U.S. PATENT DOCUMENTS

2015/0321418 A1* 11/2015 Sterman ............... B29C 64/393
264/210.1
2018/0341248 A1* 11/2018 Mehr ..................... G06N 20/10
(Continued)

FOREIGN PATENT DOCUMENTS

JP          6283053 B2    2/2018
JP          201835429 A   3/2018
(Continued)

OTHER PUBLICATIONS

Office Action issued on Jan. 18, 2022, in connection with corresponding Japanese Application No. 2020-176102 (9 pp., including machine-generated English translation).

*Primary Examiner* — Anthony M Liang
*Assistant Examiner* — Danny N Kang
(74) *Attorney, Agent, or Firm* — Maier & Maier, PLLC

(57) ABSTRACT

The present invention provides a system capable of estimating a molding state in a manufacturing process of the lamination molded object. According to the present invention, provided is a system for estimating a molding state in a manufacturing process of the lamination molded object including an image acquisition unit and an analysis unit. The lamination molded object is manufactured by repeating a material layer forming step of forming a material layer by supplying material powder onto a molding region and a solidified layer forming step of forming a solidified layer by irradiating the material layer with a laser beam. The image acquisition unit is configured to acquire image data of a spatter generated around a molten pool formed by irradiation with the laser beam. The analysis unit is configured to
(Continued)

analyze the image data to estimate a parameter representing the molding state.

8 Claims, 13 Drawing Sheets

(51) Int. Cl.
*B22F 12/41* (2021.01)
*B33Y 50/00* (2015.01)
*G06N 20/00* (2019.01)
*G06T 7/00* (2017.01)

(52) U.S. Cl.
CPC ............ *G06N 20/00* (2019.01); *G06T 7/0004* (2013.01); *G06T 2207/20081* (2013.01); *G06T 2207/30136* (2013.01)

(58) Field of Classification Search
CPC .......... B22F 10/85; B22F 12/90; B22F 10/28; B33Y 30/00; B33Y 50/00; B33Y 10/00; B33Y 50/02; G06N 20/00; G06T 7/0004; G06T 2207/20081; G06T 2207/30136; G06T 2207/10024; G06T 7/0006; Y02P 10/25

See application file for complete search history.

(56) References Cited

U.S. PATENT DOCUMENTS

| 2019/0217386 | A1 | 7/2019 | Morimoto et al. |
| 2020/0030880 | A1 | 1/2020 | Nagahama et al. |
| 2021/0387261 | A1 | 12/2021 | Takeshita |

FOREIGN PATENT DOCUMENTS

| JP | 202015944 A | 1/2020 |
| WO | 2019239531 A1 | 12/2019 |

* cited by examiner

LAMINATION MOLDING APPARATUS, MOLDING STATE ESTIMATION SYSTEM, MOLDING STATE ESTIMATION METHOD, MOLDING STATE ESTIMATION PROGRAM, AND LEARNING METHOD OF LEARNING MODEL FOR MOLDING STATE ESTIMATION

TECHNICAL FIELD

The present invention relates to a system, a method, a lamination molding apparatus, a computer program, and a learning method of a learning model for estimating a molding state of a lamination molded object.

BACKGROUND ART

Various methods are known in lamination molding of a three-dimensional molded object. For example, metal material powder is supplied to a molding region on a molding table in a chamber filled with inert gas to form a material layer, and the material layer is sintered or melted to form a solidified layer by irradiating a predetermined position of the material layer with a laser beam using a laser beam irradiation device. Then, the formation of the material layer and the solidified layer is repeated, so that solidified layers are laminated to manufacture a desired three-dimensional molded object.

In such metal lamination molding, investigation is performed in advance to determine appropriate molding conditions according to product specification. In actual molding, the settings of a lamination molding apparatus, such as a lamination thickness of the material layer and scanning conditions of the laser beam, are determined on the basis of the appropriate molding conditions obtained in the investigation.

Even if the molding conditions are set in this way, the actual molding state can change in the process of lamination molding. For example, even if the settings of the laser beam irradiation device are constant, an irradiation state, such as laser power at an irradiation point on the surface of the material layer, may change due to fumes present in a laser beam path and thermal displacement of a chamber window installed on the ceiling of the chamber and allowing the laser beam to pass through it. If such a change in the irradiation state is not dealt with, defective melting of the material layer and resulting defective formation of the solidified layer, such as voids, may occur, leading to the quality deterioration of the lamination molded object. Therefore, it is necessary to monitor the molding state in the process of lamination molding and to appropriately correct the settings of the lamination molding apparatus. Patent Literature 1 discloses a lamination molding apparatus including a means for detecting misalignment of an irradiation position of the laser beam due to thermal displacement of a component of the lamination molding apparatus and a means for correcting the irradiation position according to the misalignment.

CITATION LIST

Patent Literature

Patent Literature 1: JP-B-6283053

SUMMARY OF INVENTION

Technical Problem

If it is possible to monitor the molding state of the solidified layer in a manufacturing stage of the molded object, that is, in the process of lamination molding, it will be possible to correct the settings of the apparatus at any time when an abnormality in the molding state is detected to avoid quality deterioration. However, it is difficult to detect most of the abnormalities in the formation state of the solidified layer, such as voids, by measurement in the process of lamination molding. Although the irradiation state of the laser beam, which has a great influence on the formation state of the solidified layer, can be monitored by measurement, it requires the installation of individual measurement devices for each parameter to be monitored, which increases costs, and the measurement of some parameters requires interruption of lamination molding, which makes real-time measurement difficult.

The present invention has been made in view of such circumstances, and an object of the present invention is to provide a system capable of estimating a molding state in a manufacturing process of the lamination molded object.

Solution to Problem

According to the present invention, provided is a system for estimating a molding state in a manufacturing process of a lamination molded object, comprising an image acquisition unit and an analysis unit, wherein the lamination molded object is manufactured by repeating a material layer forming step of forming a material layer by supplying material powder onto a molding region and a solidified layer forming step of forming a solidified layer by irradiating the material layer with a laser beam, the image acquisition unit is configured to acquire image data of a spatter generated around a molten pool formed by irradiation with the laser beam, and the analysis unit is configured to analyze the image data to estimate a parameter representing the molding state.

Advantageous Effects of Invention

In the system of the present invention, the image data of the spatter generated around the molten pool formed by irradiation with the laser beam is analyzed to estimate the parameter representing the molding state. This configuration makes it possible to estimate, during molding, a parameter which has been previously difficult to monitor in the process of lamination molding. Further, various parameters can be estimated in real time from the image data of the spatter, and thus there is no need to install individual measurement devices for each parameter to be monitored.

Hereinafter, various embodiments of the present invention will be exemplified. The embodiments described below can be combined with each other.

Preferably, the parameter includes a virtual porosity, the virtual porosity being a virtual value of a porosity of the lamination molded object.

Preferably, the parameter includes at least one parameter selected from the group consisting of a laser power, a spot diameter, and a laser power density at an irradiation point of the laser beam.

Preferably, the parameter includes at least one parameter selected from the group consisting of a thickness of the material layer and a dryness of the material powder forming the material layer.

Preferably, the analysis unit further comprises a feature quantity extraction unit and a calculation unit, the feature quantity extraction unit is configured to extract a feature quantity of a spatter particle from the image data, and the calculation unit is configured to calculate an estimate value of the parameter from the feature quantity.

Preferably, the feature quantity includes at least one feature quantity selected from the group consisting of a scattering speed of the spatter particle, a size of the spatter particle, the number of spatter particles, and the number of spatter particles screened based on another feature quantity.

Preferably, the system further comprises a learning unit, and the learning unit is configured to acquire data for learning and to perform machine learning of a learning model for outputting an estimate value of the parameter from the feature quantity.

Preferably, provided is a lamination molding apparatus, comprising: a chamber: a recoater head; a laser beam irradiation device; a control device; and the above-mentioned system, wherein the chamber covers the molding region and is filled with a predetermined concentration of inert gas, the recoater head is configured to supply the material powder on the molding region to form the material layer, and the laser beam irradiation device is configured to irradiate the material layer with the laser beam to form the solidified layer.

Preferably, the control device is configured to determine whether there is an abnormality in the molding state, based on an estimation result of the parameter by the system in the manufacturing process of the lamination molded object.

Preferably, the parameter includes at least one parameter selected from the group consisting of a laser power, a spot diameter, and a laser power density at an irradiation point of the laser beam, the image acquisition unit is configured to acquire the image data of the spatter in real time during the irradiation with the laser beam, and the control device is configured to correct, in real time, a setting related to an irradiation state of the laser beam based on an estimation result of the parameter by the system.

Preferably, the parameter includes the spot diameter at the irradiation point of the laser beam, and the control device is configured to compare an estimation result of the spot diameter by the system with a threshold and to correct, based on a comparison result, a setting related to a focus of the laser beam.

According to another viewpoint of the present invention, provided is a method for estimating a molding state in a manufacturing process of a lamination molded object, comprising: an image acquisition step; and an analysis step, wherein the lamination molded object is manufactured by repeating a material layer forming step of forming a material layer by supplying material powder onto a molding region and a solidified layer forming step of forming a solidified layer by irradiating the material layer with a laser beam, in the image acquisition step, image data of a spatter generated around a molten pool formed by irradiation with the laser beam is acquired, and in the analysis step, the image data is analyzed to estimate a parameter representing the molding state.

Hereinafter, various embodiments of the present invention will be exemplified. The embodiments described below can be combined with each other.

Preferably, the parameter includes a virtual porosity, the virtual porosity being a virtual value of a porosity of the lamination molded object.

Preferably, the parameter includes at least one parameter selected from the group consisting of a laser power, a spot diameter, and a laser power density at an irradiation point of the laser beam.

Preferably, the parameter includes at least one parameter selected from the group consisting of a thickness of the material layer and a dryness of the material powder forming the material layer.

Preferably, the analysis step further comprises a feature quantity extraction step and a calculation step, in the feature quantity extraction step, a feature quantity of a spatter particle is extracted from the image data, and in the calculation step, an estimate value of the parameter is calculated from the feature quantity.

Preferably, the feature quantity includes at least one feature quantity selected from the group consisting of a scattering speed of the spatter particle, a size of the spatter particle, the total number of spatter particles, and the number of spatter particles screened based on another feature quantity.

Preferably, the method further comprises a learning step, and in the learning step, data for learning is acquired and machine learning of a learning model for outputting an estimate value of the parameter from the feature quantity is performed.

According to another viewpoint of the present invention, provided is a non-transitory computer-readable storage medium storing a computer program for causing a computer to perform a method for estimating a molding state in a manufacturing process of a lamination molded object, wherein the method comprises an image acquisition step and an analysis step, the lamination molded object is manufactured by repeating a material layer forming step of forming a material layer by supplying material powder onto a molding region and a solidified layer forming step of forming a solidified layer by irradiating the material layer with a laser beam, in the image acquisition step, image data of a spatter generated around a molten pool formed by irradiation with the laser beam is acquired, and in the analysis step, the image data is analyzed to estimate a parameter representing the molding state.

According to another viewpoint of the present invention, provided is a learning method of a learning model used for estimating a molding state in a manufacturing process of a lamination molded object, comprising: a data acquisition step; a feature quantity extraction step; and a learning step, wherein the lamination molded object is manufactured by repeating a material layer forming step of forming a material layer by supplying material powder onto a molding region and a solidified layer forming step of forming a solidified layer by irradiating the material layer with a laser beam, in the data acquisition step, image data of a spatter generated around a molten pool formed by irradiation with the laser beam and a parameter representing the molding state are acquired, in the feature quantity extraction step, a feature quantity of a spatter particle is extracted from the image data, and in the learning step, machine learning of the learning model for outputting an estimate value of the parameter from the feature quantity is performed, using the feature quantity and the parameter as data for learning.

DESCRIPTION OF EMBODIMENTS

Hereinafter, the embodiments of the present invention will be described with reference to the drawings. The characteristic matters shown in the embodiments described below can be combined with each other. Moreover, each characteristic matter independently constitutes an invention.

1. Lamination Molding Apparatus

Figure 1:
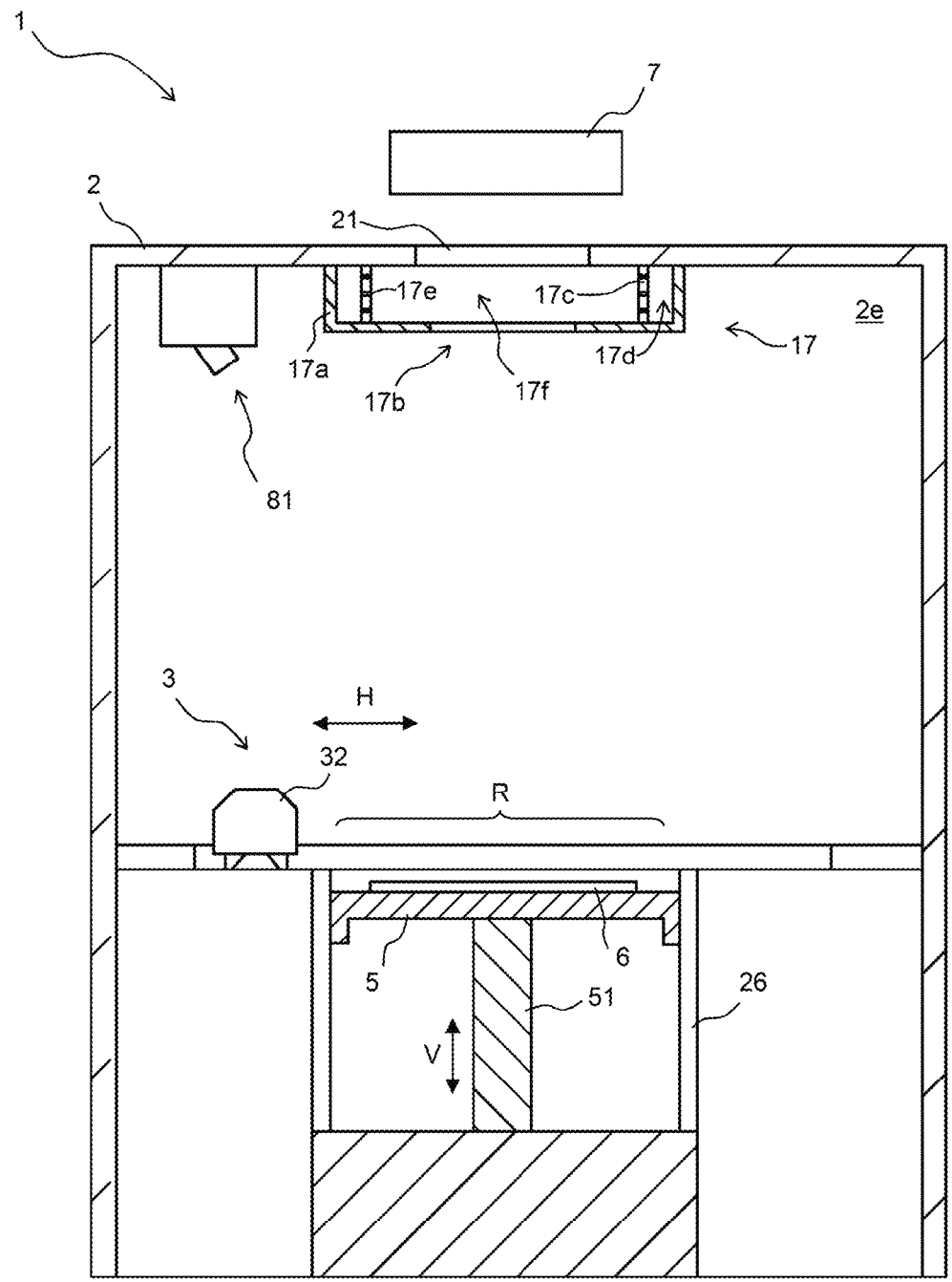
FIG. 1 is a schematic configuration diagram of a lamination molding apparatus 1 according to an embodiment of the present invention.
Figure 2:
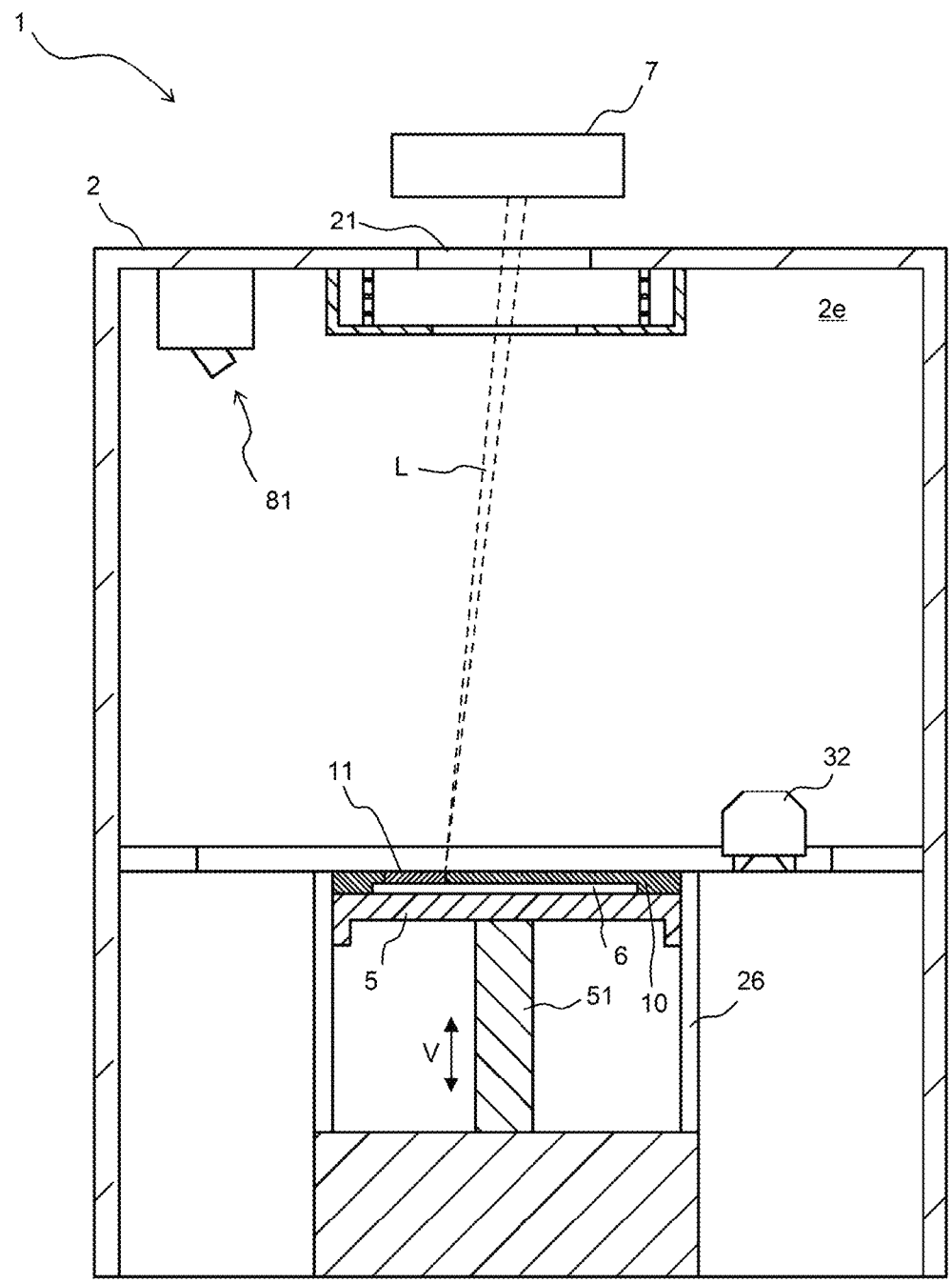
FIG. 2 is a schematic configuration diagram of the lamination molding apparatus 1 according to the embodiment of the present invention.

As shown in FIG. 1 and FIG. 2, a lamination molding apparatus 1 includes a chamber 2, a material layer forming device 3, and a laser irradiation device 7. The lamination molding apparatus 1 further comprises a molding state estimation system 8 and a control device 9 described later.

1.1 Chamber

The chamber 2 covers a molding region R where a desired lamination molded object is formed, and a molding space 2e inside the chamber 2 is filled with inert gas of a predetermined concentration supplied from an inert gas supply device (not shown). The inert gas in the present specification does not substantially react with a material layer and a solidified layer and is selected according to a type of molding material, for example, from nitrogen gas, argon gas, helium gas or the like. In metal lamination molding, the oxygen concentration around the molding region R needs to be maintained as low as possible in order to suppress the transformation of material powder and to achieve stable irradiation with a laser beam L. It is possible to keep the oxygen concentration sufficiently low by filling the chamber 2 with inert gas. In this regard, the inert gas discharged from the chamber 2 is sent to a fume collector (not shown) and returned for reuse to the chamber 2 after removing fumes. The fume collector is, for example, an electric dust collector or a filtration dust collector with a filter.

The ceiling of the chamber 2 is provided with a chamber window 21 through which the laser beam L output from the laser irradiation device 7 is transmitted. The chamber window 21 is formed of a material through which the laser beam L can be transmitted, and quartz glass, borosilicate glass, crystals of germanium, silicon, zinc selenide, potassium bromide or the like can be selected as the material according to the type of the laser beam L. For example, if the laser beam L is a fiber laser or a YAG laser, the chamber window 21 can be formed of quartz glass.

A fume diffusion unit 17 is further provided on an inner side of the ceiling of the chamber 2 so as to cover the chamber window 21. The fume diffusion unit 17 includes a cylindrical housing 17a and a cylindrical diffusion member 17c disposed in the housing 17a. An inert gas supplying space 17d is provided between the housing 17a and the diffusion member 17c. On the bottom of the housing 17a, an opening 17b is provided inside the diffusion member 17c. The diffusion member 17c is provided with a large number of pores 17e, and clean inert gas supplied into the inert gas supplying space 17d from the inert gas supply device fills a clean room 17f through the pores 17e and is ejected to the downward direction of the fume diffusion unit 17 through the opening 17b. With such a configuration, it is possible to prevent the fumes from adhering to the chamber window 21 and to eliminate the fumes from an irradiation path of the laser beam L.

1.2. Material Layer Forming Device

Figure 3:
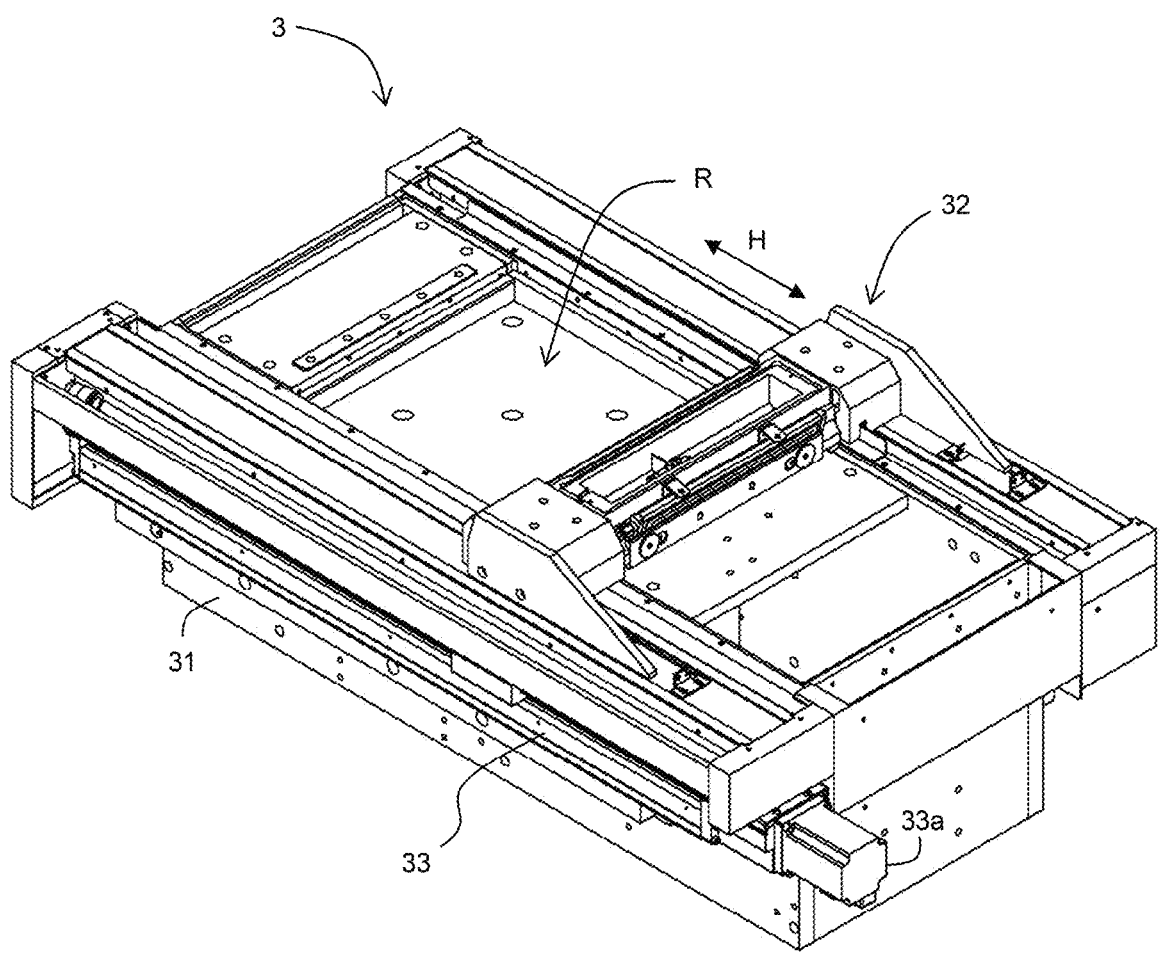
FIG. 3 is a perspective view of a material layer forming device 3.
Figure 4:
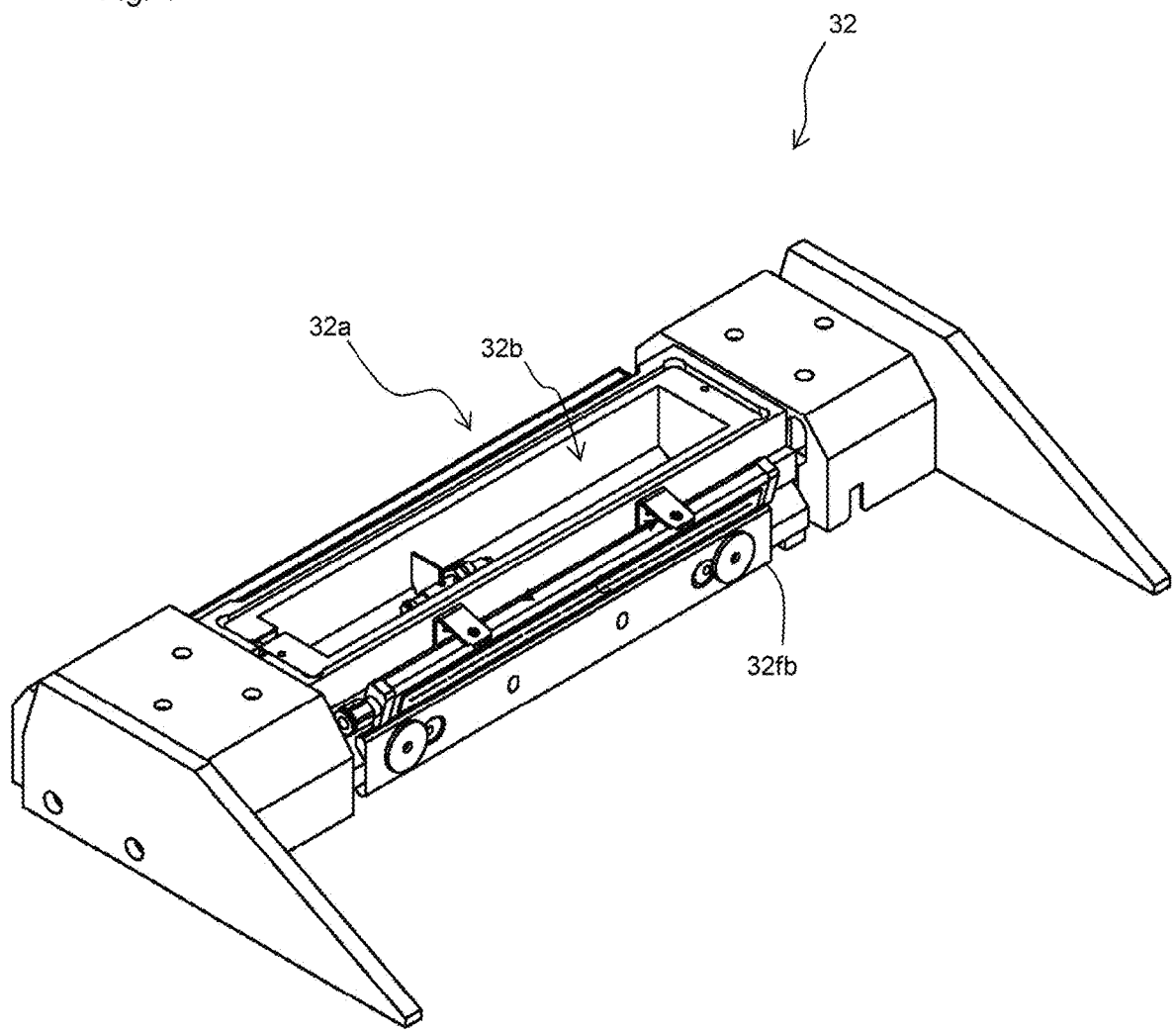
FIG. 4 is a perspective view of a recoater head 32 from above.
Figure 5:
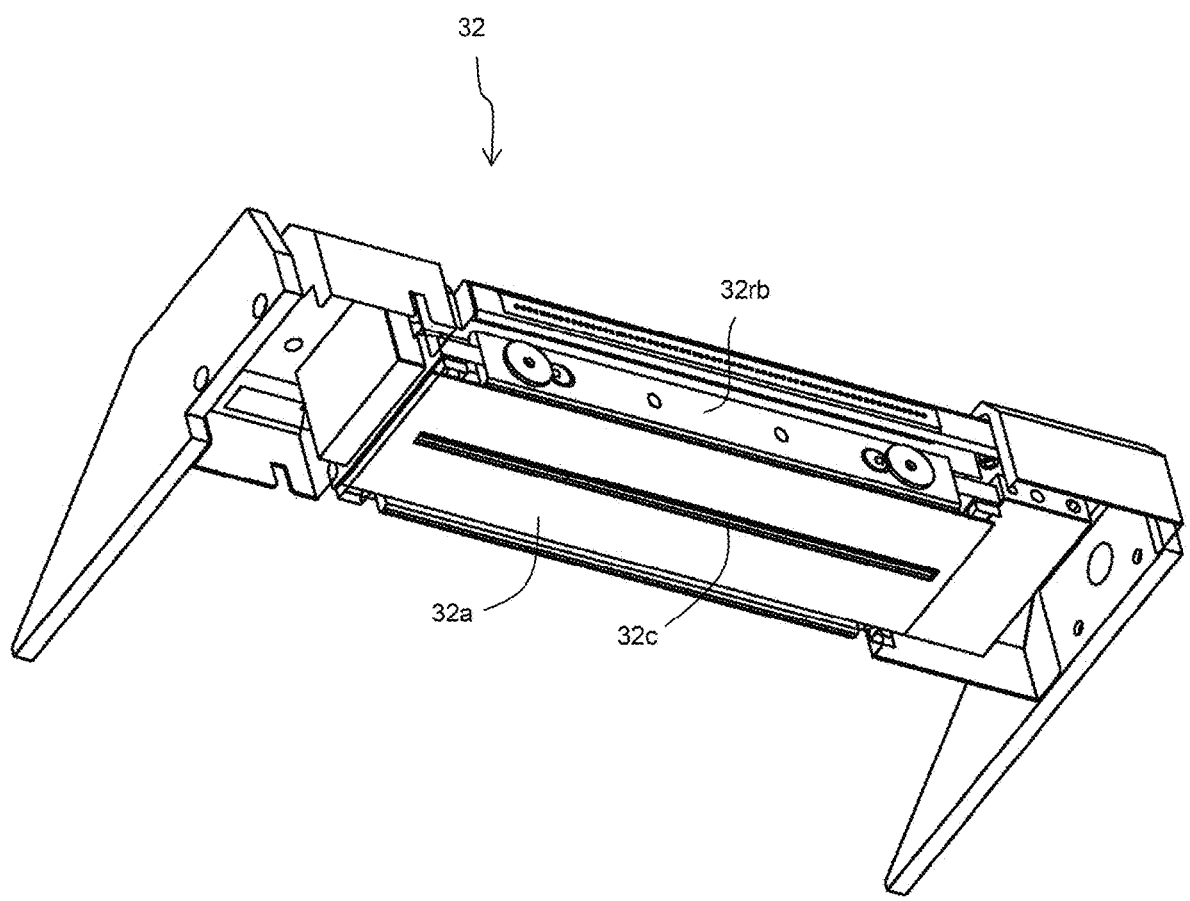
FIG. 5 is a perspective view of the recoater head 32 from below.

The material layer forming device 3 is provided inside the chamber 2. As shown in FIG. 1 to FIG. 3, the material layer forming device 3 includes a base 31 and a recoater head 32 disposed on the base 31. The base 31 has the molding region R where the lamination molded object is formed, and a molding table 5 is provided in the molding region R. The molding table 5 can be driven by a molding table driving mechanism 51 to move in the vertical direction (in the direction of an arrow V in FIG. 1). During molding, a base plate 6 is disposed on the molding table 5, and a material layer 10 is formed on an upper surface of the base plate 6.

A powder retaining wall 26 is provided around the molding table 5. A powder retaining space surrounded by the powder retaining wall 26 and the molding table 5 retains unsolidified material powder. On a lower side of the powder retaining wall 26, a powder discharge portion (not shown) is provided to discharge the material powder in the powder retaining space, and the molding table 5 is lowered after the completion of lamination molding to discharge the unsolidified material powder from the powder discharge portion.

As shown in FIG. 1 and FIG. 3 to FIG. 5, the recoater head 32 is configured to be reciprocally movable in a horizontal one-axis direction (in the direction of an arrow H) by a recoater head driving mechanism 33 and includes a material holding section 32a, a material supplying opening 32b, and a material discharging opening 32c. The recoater head driving mechanism 33 includes a motor 33a for moving the recoater head 32.

The material supplying opening 32b is provided on an upper surface of the material holding section 32a and serves as a receiving port for the material powder supplied from a material supply unit (not shown) to the material holding section 32a. The material discharging opening 32c is provided on a bottom surface of the material holding section 32a and discharges the material powder in the material holding section 32a. The material discharging opening 32c has a slit shape extending in a longitudinal direction of the material holding section 32a. Blades 32fb, 32rb are provided on both side surfaces of the recoater head 32. The blades 32fb, 32rb planarize the material powder discharged from the material discharging opening 32c to form the material layer 10.

1.3. Laser Irradiation Device

Figure 6:
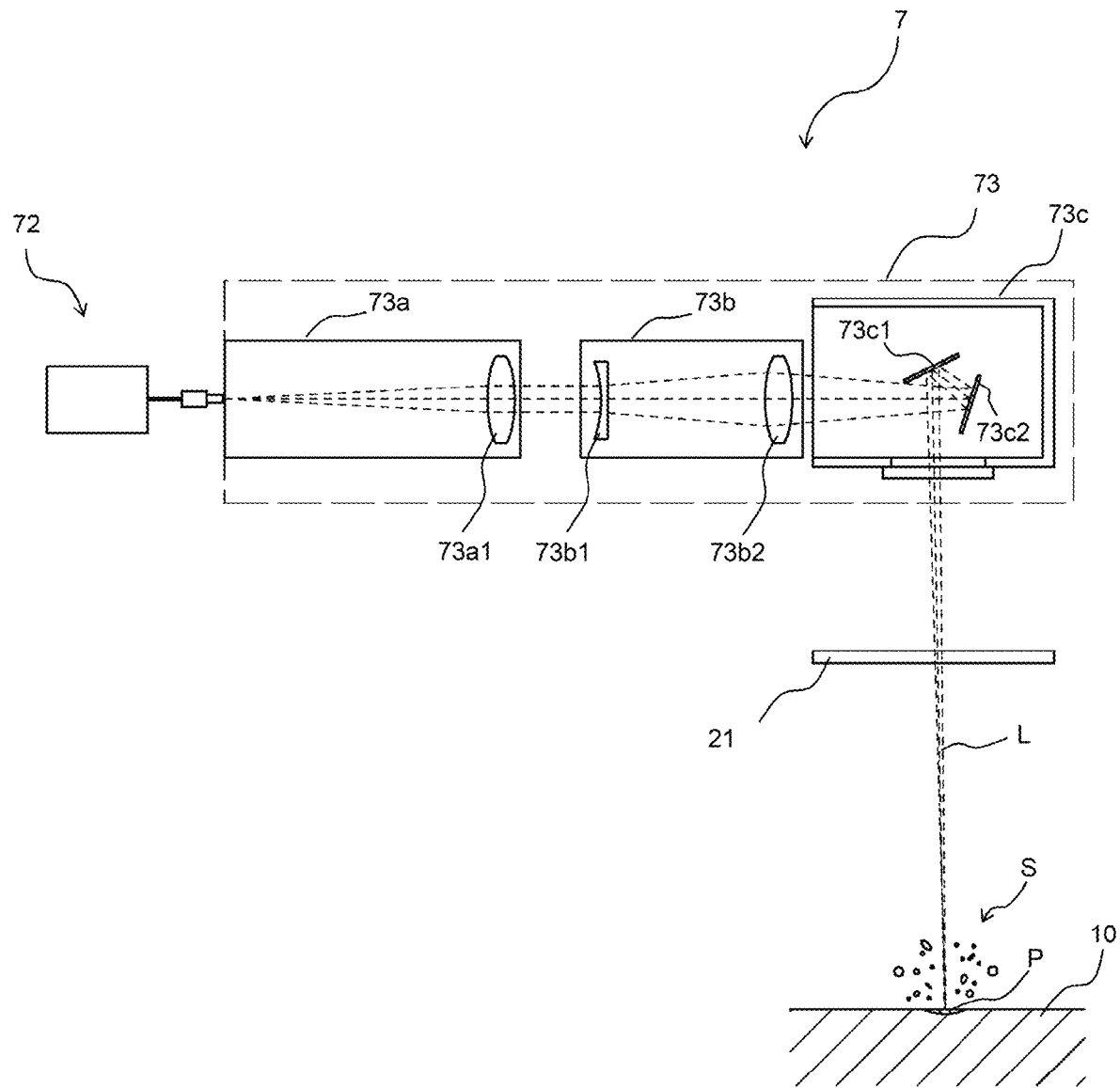
FIG. 6 shows a schematic configuration of a laser irradiation device 7 and an aspect in which a material layer 10 is irradiated with a laser beam L.

As shown in FIG. 1 and FIG. 2, the laser irradiation device 7 is provided above the chamber 2. The laser irradiation device 7 irradiates a predetermined point of the material layer 10 formed on the molding region R with the laser beam L to melt or sinter the material layer 10 at the irradiated position to solidify it. As shown in FIG. 6, the laser irradiation device 7 includes a laser oscillator 72 and a galvanometer unit 73 and is controlled by a laser control unit 93 described later.

The laser oscillator 72 is provided with a laser element serving as a laser beam source and outputs the laser beam L. The configuration of the laser beam L is not limited as long as it can melt or sinter the material powder, and for example, fiber laser, $CO_2$ laser, or YAG laser can be used.

The galvanometer unit 73 includes a collimator 73a, a focus control unit 73b, and a scanning apparatus 73c. The collimator 73a includes a collimator lens 73a1 inside and converts the laser beam L output from the laser oscillator 72 into parallel light. The focus control unit 73b includes a movable lens 73b1 and a condensing lens 73b2 inside and adjusts the laser beam L converted into the parallel light by the collimator 73a so as to have a predetermined beam diameter. The movable lens 73b1 can be moved in an optical axis direction of the laser beam L by a lens actuator (not shown), whereby the focal position of the laser beam L can be adjusted. The condensing lens 73b2 condenses the laser beam L that has passed through the movable lens 73b1. In this regard, although the movable lens 73b1 in the present embodiment is a diffusing lens having a concave surface on an upstream side and a flat surface on a downstream side along the path of the laser beam L from the laser oscillator 72, the type of lens can be appropriately selected depending on the application, and the movable lens may be a condensing lens.

The scanning apparatus 73c includes a first galvanometer mirror 73c1, a second galvanometer mirror 73c2, and a first actuator and a second actuator (not shown) for rotating each galvanometer mirror and two-dimensionally scans the laser beam L that has passed through the focus control unit 73b. The laser beam L reflected by the first galvanometer mirror 73c1 and the second galvanometer mirror 73c2 is transmitted through the chamber window 21, and the material layer 10 in the molding region R is irradiated with it, so that a solidified layer 11 is formed. In this regard, the laser irradiation device 7 is not limited to the above-mentioned configuration, and for example, an fθ lens may be used instead of the focus control unit 73b.

2. Molding State Estimation System

Figure 7:
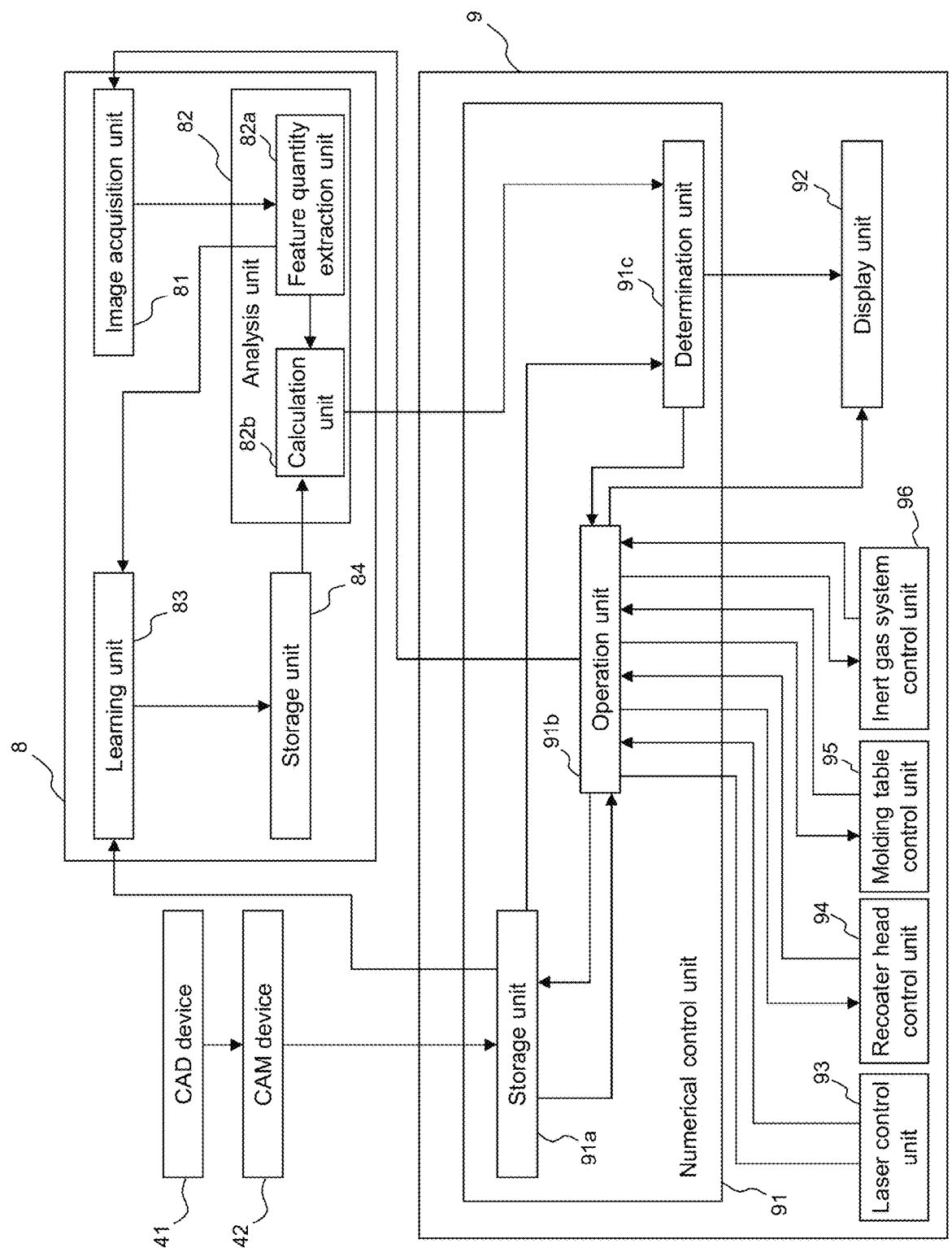
FIG. 7 is a block diagram showing a configuration of a molding state estimation system 8 and a control device 9.

Next, a system for estimating the molding state (molding state estimation system) in a manufacturing process of the lamination molded object using the lamination molding apparatus 1 will be described. As shown in FIG. 7, the molding state estimation system 8 in the present embodiment includes an image acquisition unit 81, an analysis unit 82, a learning unit 83, and a storage unit 84.

In this regard, each of the above components of the molding state estimation system 8 may be realized by software or hardware. When realized by software, various functions can be realized by CPU executing computer programs. The program may be stored in a built-in memory or a non-transitory computer-readable storage medium. Alternatively, the above functions may be realized by reading the program stored in an external memory using so-called cloud computing. When realized by hardware, the above functions can be performed by various circuits such as ASIC, FPGA, or DRP. In the present embodiment, various information and concepts including this information are dealt with. The information and concepts can be represented as a bit group of binary numbers having 0 or 1 according to the level of signal value, and communication and calculation can be executed according to configurations of the above software and hardware.

As shown in FIG. 6, when the material layer 10 is irradiated with the laser beam L, the material powder at the irradiation point is melted to form a molten pool P, and spatters S are generated around the molten pool P. In this regard, the spatter S in the present invention refers to a particle scattered from the molten pool P or its surroundings during irradiation with the laser beam L, and contains, for example, particles of molten metal scattered from the molten pool P and the material powder scattered from the molten pool P. The image acquisition unit 81 is configured to image the spatter S from above and acquire image data, and for example, a CMOS camera or a CCD camera can be used. As shown in FIG. 1, the lamination molding apparatus 1 of the present embodiment includes a camera installed on the ceiling of the chamber 2 as the image acquisition unit 81. The image data acquired in the process of lamination molding is output to the analysis unit 82. In this regard, it is preferable to acquire the image data in real time during the irradiation with the laser beam L. Further, an imaging range by the image acquisition unit 81 is not particularly limited as long as the generated spatters S are included in the image data, and the imaging range may be set to include the entire molding region R or to include a specific area of the surface of the material layer 10. In addition, the imaging range may be changed appropriately in the process of lamination molding according to the irradiated position of the laser beam L.

The analysis unit 82 is configured to analyze the image data sent from the image acquisition unit 81 to estimate a parameter representing the molding state. The analysis unit 82 includes a feature quantity extraction unit 82a and a calculation unit 82b. The feature quantity extraction unit 82a performs processing, such as particle analysis, on the image data and extracts a feature quantity of spatter particles constituting the spatter S. The calculation unit 82b calculates an estimate value of the parameter representing the molding state using the feature quantity extracted by the feature quantity extraction unit 82a. In the present embodiment, the calculation is performed using a learning model which is constructed by the learning unit 83 and is configured to output the estimate value of the parameter representing the molding state from the feature quantity of the spatter particles. The estimation result of the parameter by the calculation unit 82b is output to a determination unit 91c of the control device 9.

Examples of the feature quantity of the spatter particles include a luminance value at the center of the particle, a luminance value of the R (red) component of RGB at the center of the particle, a luminance value of the G (green) component of RGB at the center of the particle, a ratio of the luminance value of the G component to the luminance value of the R component at the center of the particle (G/R), the distance between the center of the particle and the molten pool, the distance in the X direction between the center of the particle and the molten pool, the distance in the Y direction between the center of the particle and the molten pool, a ratio of the lengths of the major axis and the minor axis when the particle is approximated by an ellipse, a ratio of the lengths of the major axis and the minor axis (elongation rate) when the particle is approximated by a rectangle, the hydraulic diameter of the particle, the perimeter of the particle, the area of the particle, the total number of particles, and the number of particles screened based on another feature quantity.

Figure 8:
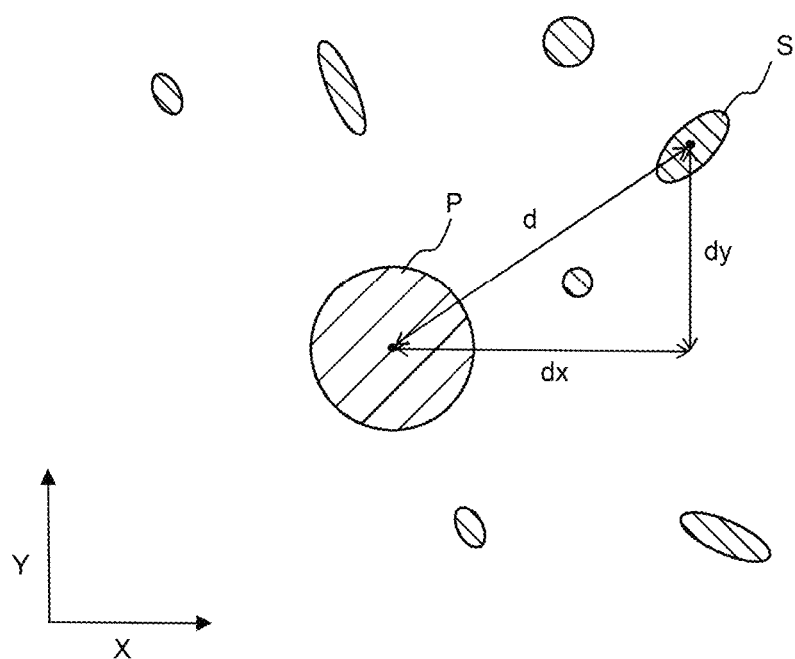
FIG. 8 is a schematic diagram showing a positional relationship between a molten pool P and spatter particles constituting a spatter S in image data acquired by an image acquisition unit 81.

FIG. 8 is a schematic diagram showing a positional relationship between the molten pool P and the spatter particles constituting the spatter S in the image data imaged from above the molten pool and acquired by the image acquisition unit 81. The distance between the center of the particle and the molten pool corresponds to the distance d (the distance between the center of the particle and the center of the molten pool) in FIG. 8, the distance in the X direction between the center of the particle and the molten pool corresponds to the distance dx in FIG. 8, and the distance in the Y direction between the center of the particle and the molten pool corresponds to the distance dy in FIG. 8.

The hydraulic diameter of the particle D is represented by the following Formula 1. A in Formula 1 represents the area of the particle, and L represents the perimeter of the particle.

$$D=4A/L \qquad \text{(Formula 1)}$$

Examples of the number of particles screened based on another feature quantity include the number of particles whose luminance value at the center of the particle is equal to or more than a predetermined value, the number of particles whose ratio of the lengths of the major axis and the minor axis when the particle is approximated by an ellipse is less than a predetermined value, and the number of particles whose elongation rate is equal to or more than a predetermined value.

In this regard, the feature quantity of the spatter particle is not limited to those exemplified above. It is preferable to use a plurality of feature quantities as inputs to the learning model. Further, a statistical value (for example, an average value) of each feature quantity of the spatter particles extracted from the image data may be calculated for the predetermined number of particles and used as the input to the learning model.

Regarding the parameter representing the molding state, the porosity of the solidified layer is an example of the parameter that can have a particularly large impact on the quality of the lamination molded object. Here, the porosity estimated using the image data acquired during the irradiation with the laser beam L is the porosity of the entire lamination molded object obtained by virtual lamination molding, assuming that the virtual lamination molding is started and completed under the conditions at the time of image data acquisition. In the present invention, such a virtual value of the porosity is defined as virtual porosity.

In addition, regarding the parameter representing the molding state, the laser power, the spot diameter and the laser power density at the irradiation point on the surface of the material layer 10 are examples of the parameter that can have a particularly large impact on the formation of the solidified layer. If the irradiation with the laser beam L deviates from a preferable state, abnormalities in the solidified layer due to defective melting or sintering of the material powder are likely to occur.

Further, regarding the parameter representing the molding state, the thickness of the material layer, and the dryness of the material powder forming the material layer are examples of the parameter that can have a particularly large impact on the formation of the solidified layer. If the formation of the material layer deviates from a preferable state, abnormalities in the solidified layer are likely to occur. In this regard, a single parameter of the above-mentioned parameters exemplified as the parameter representing the molding state may be estimated, or a plurality of the parameters may be estimated.

The learning unit 83 performs machine learning of the learning model for outputting the estimate value of the parameter representing the molding state from the feature quantity of the spatter particles. The learning model (machine learning model) in the present embodiment is a model which is trained using teacher data for learning (a set of known input data and correct answer data) and enables the prediction of future output. The teacher data can be obtained in test molding performed as investigation in advance of lamination molding. In the test molding, the lamination molding is performed while changing irradiation conditions of the laser beam L to acquire the image data of the spatter using the image acquisition unit 81. Further, the porosity of the obtained lamination molded object is measured after the test molding, for example, by cross-section observation. The feature quantity of spatter particles can be extracted by the feature quantity extraction unit 82a from the image data of the spatter acquired in this way and used as the input data of the teacher data. Further, the measured value of the porosity, and the values of the laser power, the spot diameter, and the laser power density of the laser beam L obtained by actual measurement or the like can be used as the correct answer data of the teacher data.

As a machine learning method, various algorithms can be used depending on the purpose and conditions, and for example, a neural network model based on deep learning can be used. The learning model constructed by learning using the above-mentioned teacher data in the present embodiment is a neural network model including an input layer to which the feature quantities of the spatter particles are given, an output layer in which the parameters representing the molding state are output, and one or more hidden layers.

The storage unit 84 stores the learning model constructed by the learning unit 83 and other information.

As described above, the molding state estimation system 8 in the present embodiment is configured to calculate the estimate value of the parameter representing the molding state by extracting the feature quantities of the spatter particles from the image data of the spatter S and inputting them to the learning model. Various parameters related to the formation state of the solidified layer (voids), the irradiation state of the laser beam L, and the formation state of the material layer 10 can be estimated from the image data acquired by the image acquisition unit 81, and thus it is not necessary to install individual measurement devices for each parameter. Further, since the image data of the spatter S can be acquired in real time, the parameters can be estimated in real time. In addition, it is not necessary to interrupt lamination molding at the time of measurement, and thus the influence on production efficiency is small 3. Control Device Next, the control device 9 for controlling the lamination molding apparatus 1 will be described.

As shown in FIG. 7, the control device 9 includes a numerical control unit 91, a display unit 92, and control units 93, 94, 95, 96 of devices included in the lamination molding apparatus 1. The control device 9 controls the operation of the lamination molding apparatus 1 and also plays a role in monitoring the molding state of the solidified layer.

A CAD device 41 and a CAM device 42 are installed outside the control device 9. The CAD device 41 is configured to create three-dimensional shape data (CAD data) representing the shape and dimensions of the lamination molded object to be molded. The created CAD data are output to the CAM device 42.

The CAM device 42 is configured to create operation procedure data (CAM data) of the devices included in the lamination molding apparatus 1 when molding the lamination molded object based on the CAD data created by the CAD device 41. The CAM data includes, for example, data of irradiation conditions and irradiation positions of the laser beam L in each material layer. The created CAM data are output to the numerical control unit 91.

The numerical control unit 91 is configured to perform an operation based on a numerical control program on the CAM data created by the CAM device 42 and to create an operation command for the lamination molding apparatus 1. The numerical control unit 91 includes a storage unit 91$a$, an operation unit 91$b$, and the determination unit 91$c$. The operation unit 91$b$ perform the operation on the CAM data using the numerical control program stored in the storage unit 91$a$ to output the operation command in the form of a signal or data of operation command values to the control units 93, 94, 95, 96 for controlling the devices included in the lamination molding apparatus 1.

The laser control unit 93 controls the operation of the laser irradiation device 7 according to the operation command Specifically, the laser oscillator 72 is controlled to output the laser beam L at a predetermined intensity and irradiation timing. Further, the lens actuator is controlled to move the movable lens 73$b$1, so that the laser beam L is adjusted to have a predetermined beam diameter. The first actuator and the second actuator are controlled to rotate the first galvanometer mirror 73$c$1 and the second galvanometer mirror 73$c$2 to desired angles, respectively. Further, the laser control unit 93 feeds back the actual operation information of the laser irradiation device 7 to the numerical control unit 91.

The recoater head control unit 94 controls the recoater head driving mechanism 33 according to the operation command, and under such control, the recoater head driving mechanism 33 rotates the motor 33$a$ to move the recoater head 32 reciprocally in the horizontal one-axis direction. Further, the recoater head control unit 94 feeds back the actual operation information of the recoater head 32 to the numerical control unit 91.

The molding table control unit 95 controls the molding table driving mechanism 51 according to the operation command, and under such control, the molding table driving mechanism 51 rotates a motor (not shown) to move the molding table 5 in the vertical direction. Further, the molding table control unit 95 feeds back the actual operation information of the molding table 5 to the numerical control unit 91.

The inert gas system control unit 96 controls the operation of the inert gas supply device and the fume collector according to the operation command. Further, it feeds back the actual operation information of the inert gas supply and discharge systems to the numerical control unit 91.

The determination unit 91$c$ determines whether there is an abnormality in the molding state of the solidified layer, using the estimation result of the parameter representing the molding state received from the calculation unit 82$b$ of the analysis unit 82 of the molding state estimation system 8. The determination unit 91$c$ in the present embodiment compares the estimate value of the parameter with a threshold or an acceptable range of each parameter stored in the storage unit 91$a$ to determine whether there is an abnormality in the molding state.

When the virtual porosity is estimated as the parameter representing the molding state, an upper limit value corresponding to the acceptable range of the virtual porosity is stored in the storage unit 91$a$ because the lower the virtual porosity is, the more preferable the formation state of the solidified layer is. The determination unit 91$c$ compares the virtual porosity with the upper limit value and determines that there is no abnormality in the formation state of the solidified layer if the virtual porosity is equal to or less than the upper limit value, while it determines that there is an abnormality in the formation state of the solidified layer if the virtual porosity is more than the upper limit value.

When the laser power, the spot diameter, or the laser power density of the laser beam L is estimated as the parameter representing the molding state, there are appropriate ranges for these parameters depending on conditions of the material powder and the like. For example, if the laser power and the laser power density of the laser beam L exceed the appropriate range (excessive melting) or fall below the appropriate range (insufficient melting), the defective formation of the solidified layer is likely to occur. Therefore, an upper limit value and a lower limit value corresponding to the acceptable range of these parameters are stored in the storage unit 91$a$. The determination unit 91$c$ compares these parameters with the upper limit value and the lower limit value and determines that there is no abnormality in the irradiation state of the laser beam L if the parameter is equal to or more than the lower limit value and equal to or less than the upper limit value, while it determines that there is an abnormality in the irradiation state of the laser beam L if the parameter is lower than the lower limit value or more than the upper limit value.

When the thickness of the material layer or the dryness of the material powder forming the material layer is estimated as the parameter representing the molding state, there is an appropriate range for the thickness of the material layer depending on characteristics of the material powder and the like. Therefore, an upper limit value and a lower limit value corresponding to the acceptable range of the thickness of the material layer is stored in the storage unit 91$a$. The determination unit 91$c$ compares this parameter with the upper limit value and the lower limit value and determines that there is no abnormality in the formation state of the material layer if the parameter is equal to or more than the lower limit value and equal to or less than the upper limit value, while it determines that there is an abnormality in the formation state of the material layer if the parameter is lower than the lower limit value or more than the upper limit value. Meanwhile, regarding the dryness of the material powder, the lower the moisture content of the material powder is, the more desirable the state of the material powder is. Therefore, an upper limit value corresponding to the acceptable range of the moisture content is stored in the storage unit 91$a$. The determination unit 91$c$ compares this parameter with the upper limit value and determines that there is no abnormality in the formation state of the material layer if the parameter is equal to or less than the upper limit value, while it determines that there is an abnormality in the formation state of the material layer if the parameter is more than the upper limit value.

The storage unit 91$a$ stores the CAM data, the numerical control program, the threshold or the acceptable range used by the determination unit 91$c$ in determining abnormality as described above, and determination results of abnormality by the determination unit 91$c$.

The display unit 92 displays the operation command output by the operation unit 91b of the numerical control unit 91 and the determination results of abnormality by the determination unit 91c.

4. Manufacturing Method of Lamination Molded Object

Next, a molding method of the lamination molded object using the lamination molding apparatus 1 of the present embodiment will be described.

Test molding is performed prior to the lamination molding, and machine learning of the learning model is performed by the learning unit 83 of the molding state estimation system 8 using the teacher data obtained by the test molding. In the test molding, the image data of the spatter S which is generated around the molten pool P formed by the irradiation with the laser beam L is acquired by the image acquisition unit 81, and data of the parameter representing the molding state to be estimated are acquired. The learning unit 83 extracts the feature quantity of the spatter particles from the image data and performs the machine learning of the learning model for outputting the estimate value of the parameter from the feature quantity, using the feature quantity and the data of the parameter representing the molding state as data for learning.

Figure 9:
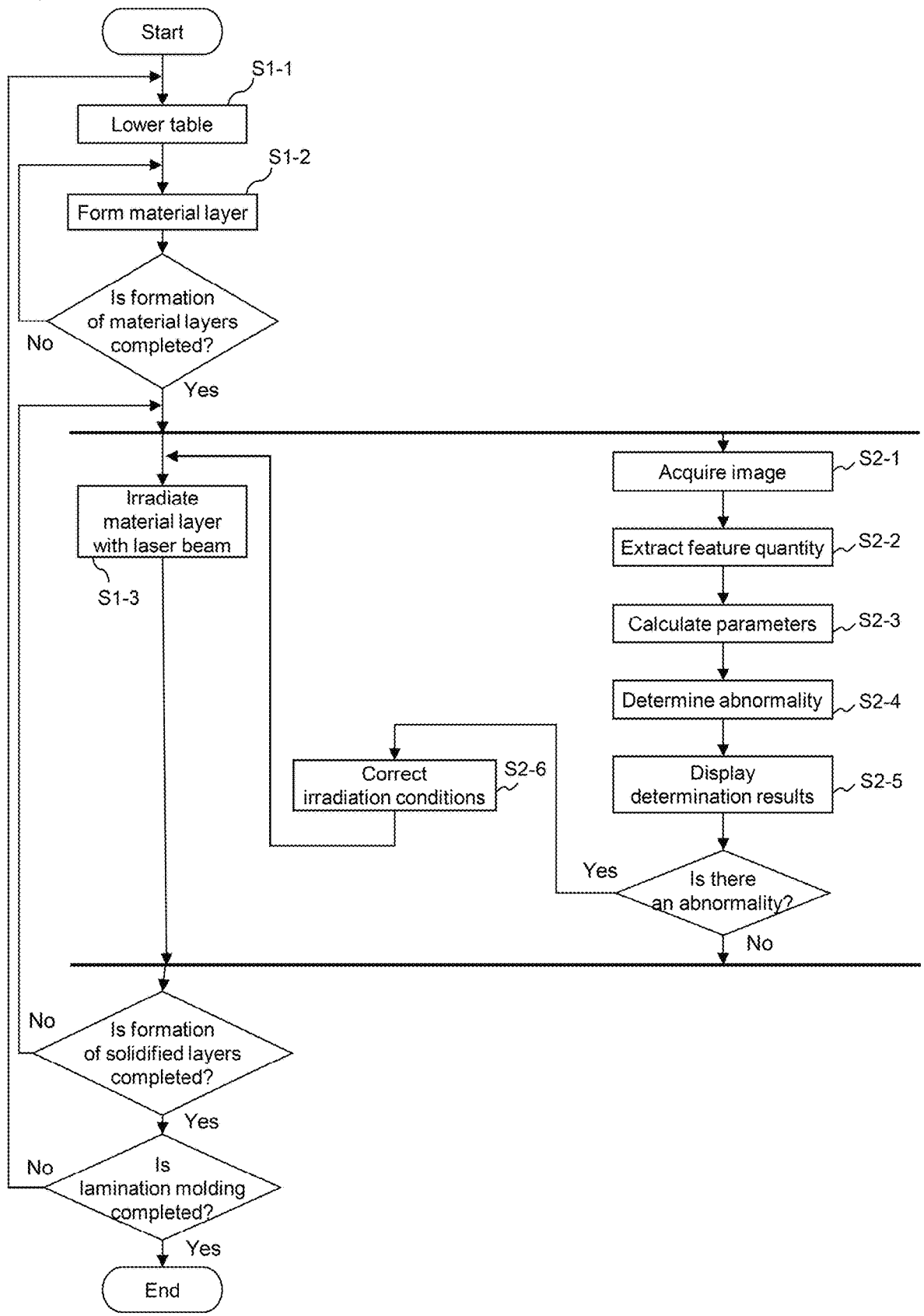
FIG. 9 is a flow diagram showing a molding method of a lamination molded object using the lamination molding apparatus 1 according to the embodiment of the present invention.
Figure 10:
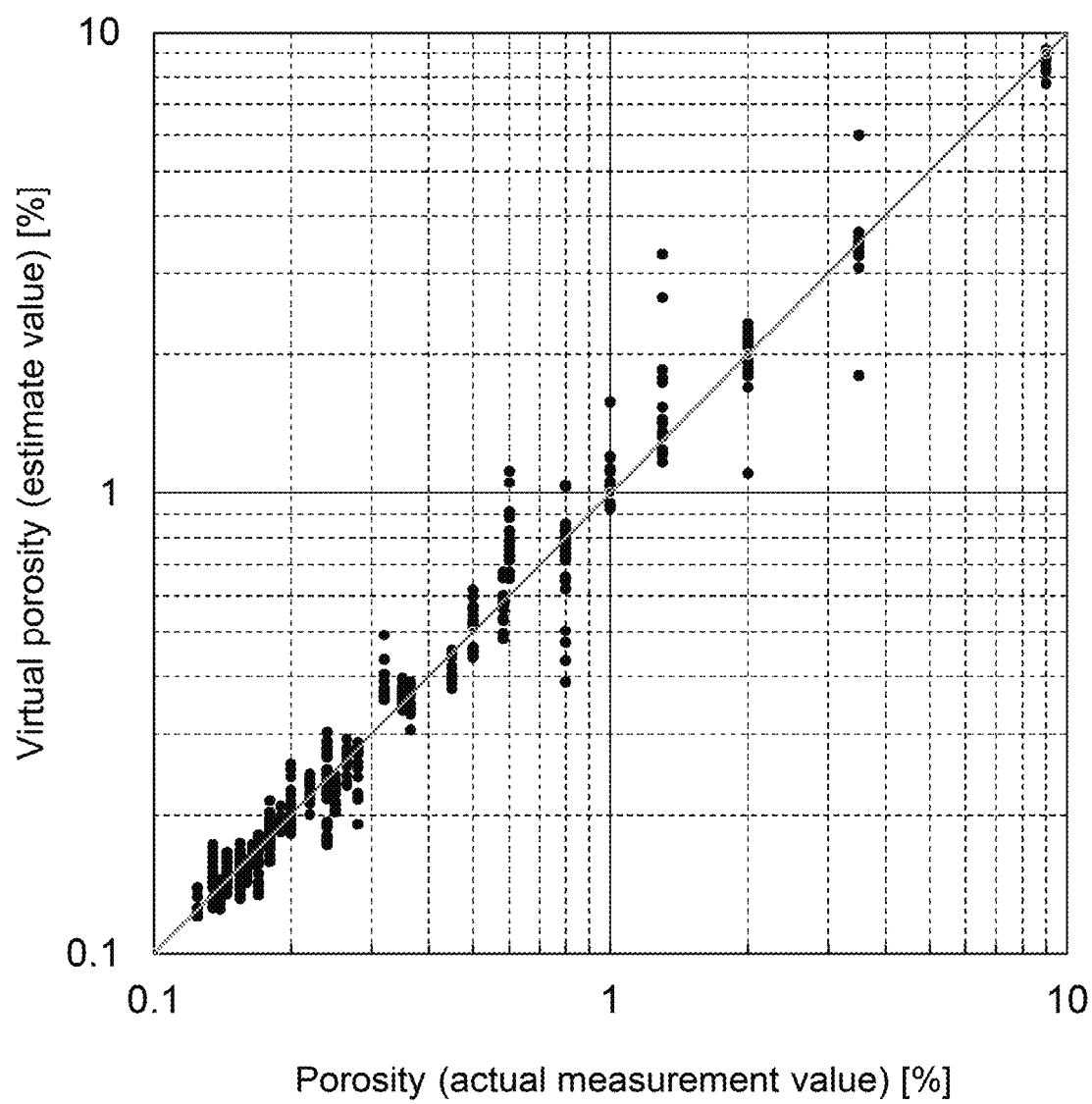
FIG. 10 is a graph showing a relationship between an estimate value of virtual porosity and an actual measurement value of porosity in Example.
Figure 11:
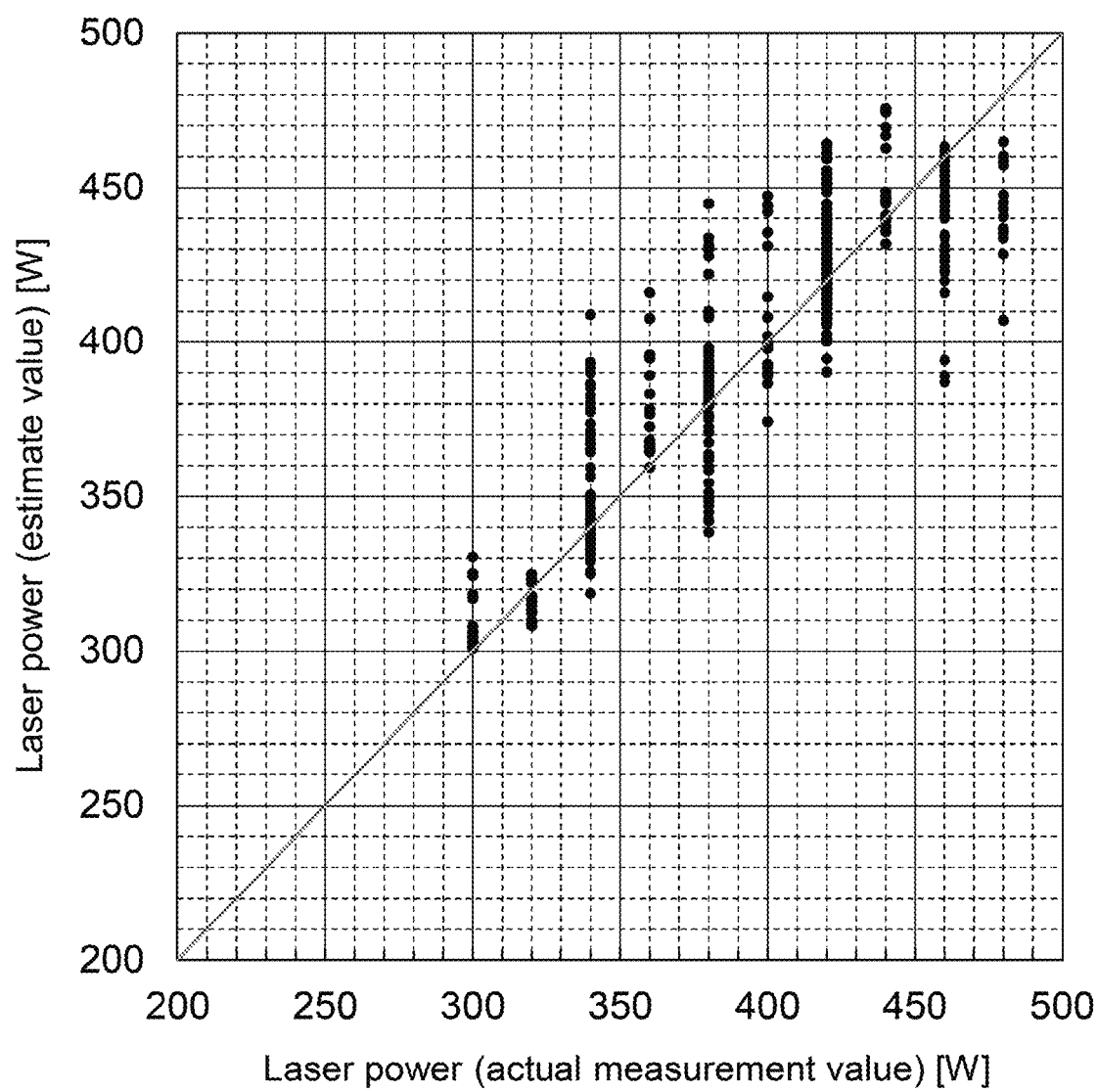
FIG. 11 is a graph showing a relationship between an estimate value and an actual measurement value of laser power in Example.
Figure 12:
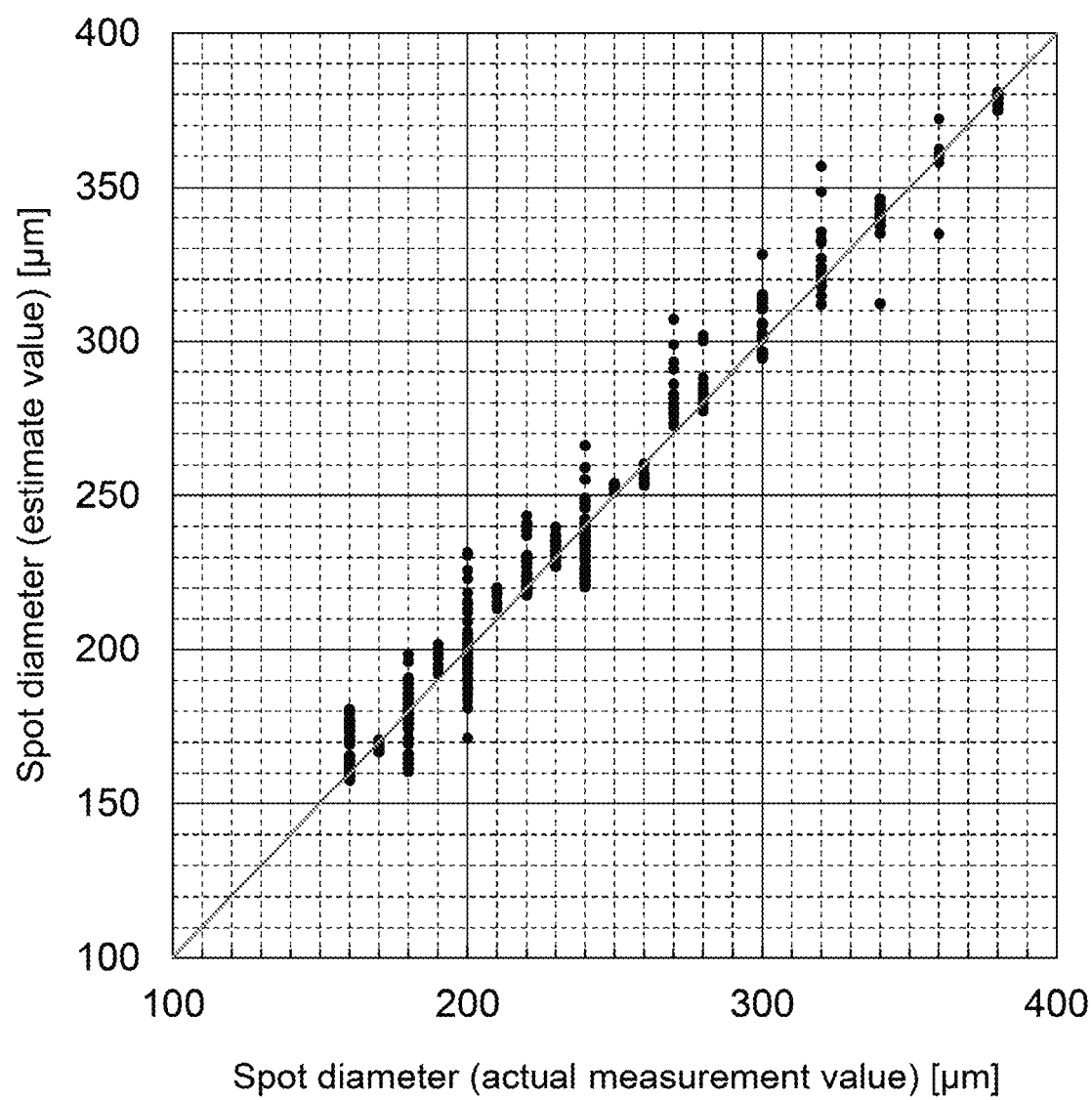
FIG. 12 is a graph showing a relationship between an estimate value and an actual measurement value e of spot diameter in Example.
Figure 13:
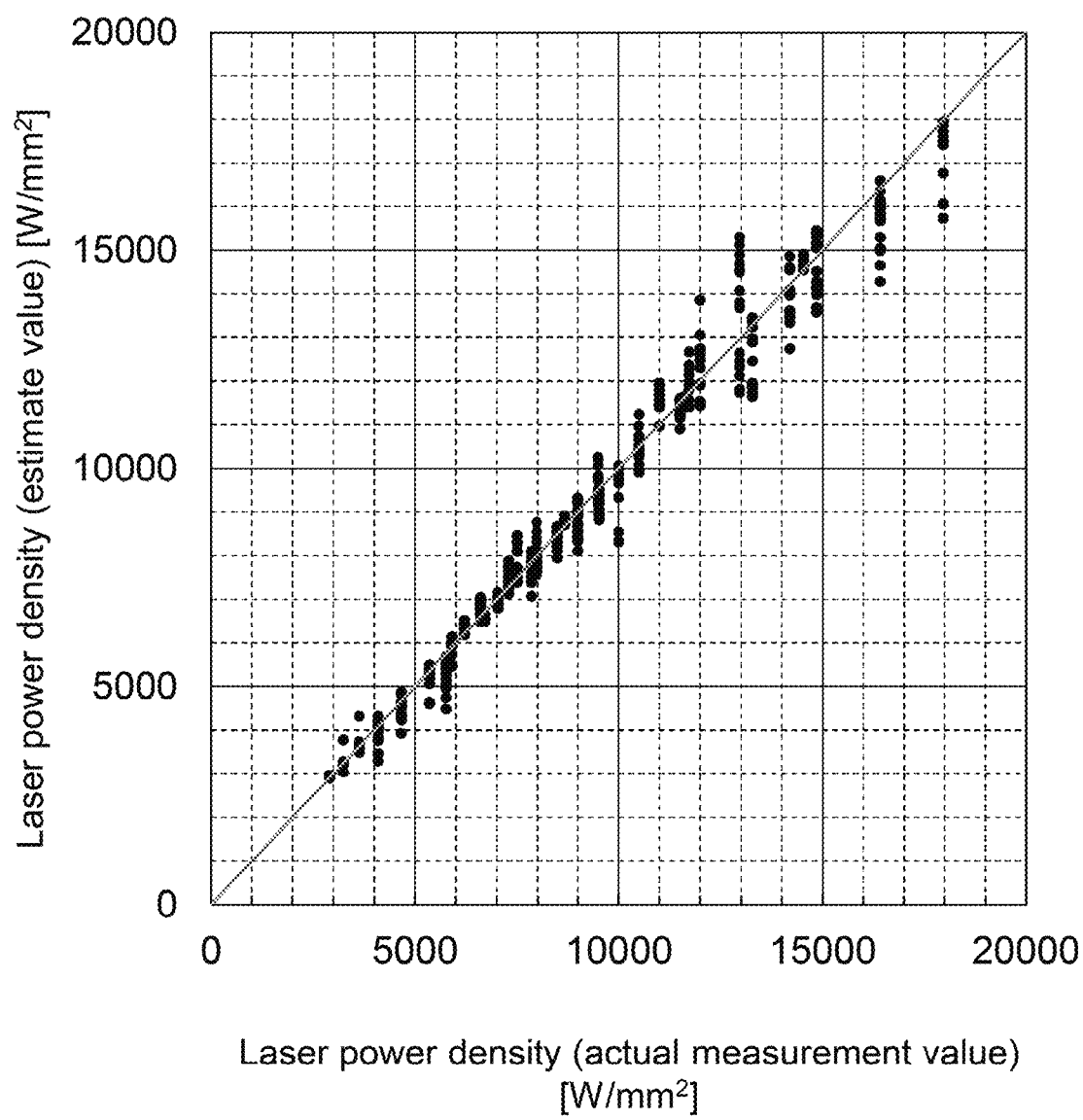
FIG. 13 is a graph showing a relationship between an estimate value and an actual measurement value of laser power density in Example.

As shown in FIG. 9, when the lamination molding apparatus 1 starts lamination molding, the molding table 5 on which the base plate 6 is placed is lowered and adjusted to an appropriate position (step S1-1). The recoater head 32 is moved in the direction of the arrow H in FIG. 1 from the left side to the right side of the molding region R to form the material layer 10 (step S1-2). Further, a predetermined point of the material layer 10 is irradiated with the laser beam L to solidify the material layer 10 (step S1-3).

In parallel with such manufacturing of the lamination molded object, the molding state is monitored. In parallel with the irradiation with the laser beam L, the image acquisition unit 81 acquires the image data of the spatter S generated around the molten pool in real time (step S2-1). The acquired image data is sent to the analysis unit 82, and the feature quantity extraction unit 82a extracts the feature quantity of the spatter particles from the image data (step S2-2). The calculation unit 82b inputs the feature quantity of the spatter particles to the learning model to calculate the estimate value of the parameter representing the molding state (step S2-3).

The determination unit 91c determines whether there is an abnormality in the molding state, using the estimate value of the parameter sent from the calculation unit 82b (step S2-4). The determination result is displayed by the display unit 92 together with the calculation result of the estimate value of the parameter (step S2-5). If it is determined that there is an abnormality in the molding state, measures, such as stopping the operation of the devices included in the lamination molding apparatus 1 and correcting their settings, are taken to resolve the abnormality.

As an example of such a measure, FIG. 9 shows a procedure for correcting the irradiation condition of the laser beam L and re-irradiating an area of the material layer 10 irradiated with the laser beam L when it is determined from the estimation result of the virtual porosity that there is an abnormality in the formation state of the solidified layer. The operation unit 91b corrects the irradiation condition on the basis of the determination result, that is, determines the irradiation condition for re-irradiation and outputs an operation command to the laser control unit 93 (step S2-6). Since the material layer 10 at the time of re-irradiation has already solidified and has a larger heat capacity, it is necessary to change the condition, for example, by slowing down the scanning speed of the laser beam L compared to the case of irradiating the material powder.

As another example, if the estimate value of the laser power is out of the acceptable range, the output setting of the laser irradiation device 7 can be corrected, or control can be performed so that the laser power for irradiating the material layer can be constant. For example, if the laser beam L is shielded by the fumes due to an increase in the fume concentration in the chamber 2 and the laser power is attenuated, the output of the laser irradiation device 7 can be increased to compensate for the attenuation of the laser power. Alternatively, the irradiation with the laser beam L can be stopped when the attenuation of the laser power exceeds a predetermined level, and then the irradiation can be restarted when the concentration of the fumes is sufficiently lowered due to the discharge of the inert gas containing the fumes from the chamber 2 and the supply of the new inert gas to the chamber 2. It is also possible to perform control to keep the laser power at a substantially constant level by outputting an operation command according to the attenuation of the laser power to the inert gas system control unit 96 and correcting the settings related to the operation of the fume collector (for example, the rotation speed of a fan of the fume collector).

If the spot diameter of the laser beam L is out of the acceptable range, for example, the movable lens 73b1 of the laser irradiation device 7 can be moved to adjust the focal position. Further, when the material layer 10 is irradiated with the laser beam L through the chamber window 21, the energy of the laser beam L may be partially absorbed in the chamber window 21 due to causes, such as fume adhesion to the chamber window 21, deterioration of the chamber window 21 (for example, the peeling of coating), and cloudiness due to poor cleaning, resulting in a local temperature rise. When there is a possibility of so-called focus shift in which the focus of the laser beam L shifts due to the thermal lens effect of changing the refractive index with such a temperature rise, it is possible to replace the chamber window 21.

If it is determined that there is an abnormality in the formation status of the material layer 10, the recoater head 32 can be moved again after performing a predetermined operation to re-form the material layer 10. As such a predetermined operation, for example, when the fluidity of the material powder is reduced due to moisture absorption or the like and the supply from the material discharging opening 32c is stagnant, the recoater head 32 can be vibrated by moving it quickly back and forth in the direction of the arrow H, so that the aggregation or clogging of the material powder in the material holding section 32a is eliminated to promote the discharge of the material powder.

The measures described above may be performed during the molding of the solidified layer by the irradiation with the laser beam L or performed after the molding of one solidified layer is completed and before the molding of the next layer is started. Further, the measures may be performed manually or automatically. When the case of manual operation, an operator of the lamination molding apparatus 1 takes an appropriate measure depending on the determination result of the abnormality in the molding state displayed on the display unit 92. In the case of automatic operation, the operation unit 91b of the numerical control unit 91 may be configured to calculate a corrected value for the operation command using the determination result sent from the determination unit 91c. Further, the calculation of the corrected value may be performed in real time during the operation of the lamination molding apparatus 1 to output a corrected operation command to the control units of the devices included in the lamination molding apparatus 1.

If it is determined that there is no abnormality in the molding state, or if the molding of the first solidified layer 11 is completed after the abnormality is resolved by taking the measures described above, the molding table 5 is lowered by the thickness of one material layer. Then, the same method as described above is repeated to mold the second and subsequent layers. After the lamination molding is completed, unsolidified material powder and cutting chips are discharged to obtain the lamination molded object.

As described above, in the manufacturing method of the lamination molded object according to the present embodiment, while the molding state estimation system 8 estimates the parameter representing the molding state in real time, the control device 9 determines whether there is an abnormality in the molding state of the solidified layer using the estimation result. With such a configuration, it is possible to correct the settings of the devices included in the lamination molding apparatus 1 as soon as an abnormality in the molding state is detected, so that quality deterioration can be avoided.

EXAMPLE

Hereinafter, the machine learning of the learning model and the estimation of the parameter representing the molding state by the molding state estimation system 8 of the present embodiment will be described in more detail using examples.

The image acquisition unit 81 of the molding state estimation system 8 in Example is provided with a camera (manufactured by Sony Corporation, model: XCG-CG510C, maximum number of output pixels: 2464×2056, frame rate: 23 fps), a lens (manufactured by VS Technology Corporation, model: VS-2514H1), and an orange filter (manufactured by Edmund Optics Japan Inc., model: 89805) and is installed on the ceiling of the chamber 2. The imaging range of the image acquisition unit 81 was set to include the entire molding region R of 250 mm square, and the exposure time of the camera was set to 500 μsec.

First, the machine learning of the learning model was performed. While the irradiation conditions of the laser beam L are varied in the range of 300 to 480 [W] for laser power and in the range of 160 to 380 [μm] for spot diameter, lamination molding was performed in an area of 40 mm square using material powder made of maraging steel, and the image data of the spatter S was acquired by the image acquisition unit 81. Further, after the completion of molding, the porosity of the obtained lamination molded object was measured by cross-section observation.

For the image data of the spatter S, binarization processing as preprocessing was performed on spatter particles having a luminance value of 20 to 255, and the molten pool and the spatter particles having a pixel size of 19 or less were removed from the image data. Particle analysis was performed on the preprocessed image data to extract a total of 16 feature quantities of the spatter particles including a luminance value at the center of the particle, a luminance value of the R (red) component of RGB at the center of the particle, a luminance value of the G (green) component of RGB at the center of the particle, a ratio of the luminance value of the G component to the luminance value of the R component at the center of the particle (G/R), the distance between the center of the particle and the molten pool, the distance in the X direction between the center of the particle and the molten pool, the distance in the Y direction between the center of the particle and the molten pool, a ratio of the lengths of the major axis and the minor axis when the particle is approximated by an ellipse, a ratio of the lengths of the major axis and the minor axis (elongation rate) when the particle is approximated by a rectangle, the hydraulic diameter of the particle, the perimeter of the particle, the area of the particle, the total number of particles, the number of particles having a luminance value of 130 or more at the center of the particle, the number of particles whose ratio of the lengths of the major axis and the minor axis is less than 2 when the particle is approximated by an ellipse, and the number of particles having an elongation rate of 8 or more.

A part of the feature quantities extracted in this way were used as the input of teacher data for training the learning model. Further, the actual measurement values of the virtual porosity of the lamination molded object and the laser power, the spot diameter, and the laser power density of the laser beam L corresponding to the teacher data was used as the output, and the number of hidden layers was set to 7 to perform machine learning by deep learning.

Next, the data that were not used as the teacher data were used as test data to evaluate the learning model. The feature quantities as the test data were input to the learning model to obtain estimate values of the virtual porosity, the laser power, the spot diameter, and the laser power density.

FIG. 10 to FIG. 13 show the actual measurement value (horizontal axis) and the estimate value (vertical axis) by the molding state estimation system 8 for the porosity of the lamination molded object, the laser power, the spot diameter, and the laser power density of the laser beam L. In general, if the porosity of the lamination molded object is 0.3% or less, the solidified layer can be considered to be in an excellent molding state. Of the 372 data points in the range where the actual measurement value of the porosity was 0.3% or less, only one data point had an estimate value of the virtual porosity of more than 0.3. Although some variation was recognized in the data of the laser power, the spot diameter, and the laser power density, the accuracy of the estimation was excellent.

The preferred embodiments of the present invention have been described above, and the present invention is not limited to the above-mentioned embodiments. That is, various design changes can be made within the scope of the claims.

REFERENCE SIGNS LIST

1: lamination molding apparatus, 2: chamber, 2e: molding space, 3: material layer forming device, 5: molding table, 6: base plate, 7: laser beam irradiation device, 8: molding state estimation system, 9: control device, 10: material layer, 11: solidified layer, 17: fume diffusion unit, 17a: housing, 17b: opening, 17c: diffusion member, 17d: inert gas supplying space, 17e: pores, 17f: clean room, 21: chamber window, 26: powder retaining wall, 31: base, 32: recoater head, 32a: material holding section, 32b: material supplying opening, 32c: material discharging opening, 32fb,32rb: blade, 33: recoater head driving mechanism, 33a: motor, 41: CAD device, 42: CAM device, 51: molding table driving mechanism, 72: laser oscillator, 73: galvanometer unit, 73a: collimator, 73a1: collimator lens, 73b: focus control unit, 73b1: movable lens, 73b2: condensing lens, 73c: scanning apparatus, 73c1: first galvanometer mirror, 73c2: second galvanometer mirror, 81: image acquisition unit, 82: analysis unit, 82a: feature quantity extraction unit, 82b: calculation unit, 83: learning unit, 84: storage unit, 91: numerical control unit, 91a: storage unit, 91b: operation unit, 91c: determination unit, 92: display unit, 93: laser control unit, 94: recoater head control unit, 95: molding table control unit, 96: inert gas system control unit, L: laser beam, P: molten pool, R: molding region, S: spatter

The invention claimed is:

1. A system for estimating a molding state in a manufacturing process of a lamination molded object, comprising:
an image acquisition unit comprising a camera; and
an analysis unit,
wherein the lamination molded object is manufactured by repeating a material layer forming step of forming a material layer by supplying material powder onto a molding region and a solidified layer forming step of forming a solidified layer by irradiating the material layer with a laser beam,
the image acquisition unit is configured to acquire, in real time, image data of a spatter generated around a molten pool formed by irradiation on the lamination molded object with the laser beam as the lamination molded object undergoes manufacturing, said spatter comprising a quantity of particles scattered from the molten pool or from the surroundings of the molten pool during the irradiation with the laser beam, and
the analysis unit is configured to analyze the image data to estimate, in real time, a parameter representing the molding state, wherein the parameter includes a virtual porosity, the virtual porosity being a virtual value of a porosity of the lamination molded object.

2. The system of claim 1,
wherein the parameter includes at least one parameter selected from the group consisting of a laser power, a spot diameter, and a laser power density at an irradiation point of the laser beam.

3. The system of claim 1,
wherein the parameter includes at least one parameter selected from the group consisting of a thickness of the material layer and a dryness of the material powder forming the material layer.

4. The system of claim 1,
wherein the analysis unit further comprises a feature quantity extraction unit and a calculation unit,
the feature quantity extraction unit is configured to extract a feature quantity of a spatter particle from the image data, and
the calculation unit is configured to calculate an estimate value of the parameter from the feature quantity.

5. The system of claim 4,
wherein the feature quantity includes at least one feature quantity selected from the group consisting of a scattering speed of the spatter particle, a size of the spatter particle, the total number of spatter particles, and the number of spatter particles screened based on another feature quantity.

6. The system of claim 4, further comprising a learning unit,
wherein the learning unit is configured to acquire data for learning and to perform machine learning of a learning model for outputting an estimate value of the parameter from the feature quantity.

7. The system of claim 1, further comprising a control unit, wherein in the manufacturing process of the lamination molded object, the control unit performs one or both of (i) a correction of the irradiation condition of the laser beam, and (ii) a re-formation of the material layer, depending on whether an estimated value of the parameter is in a predetermined range or not.

8. The system of claim 1, further comprising a control unit and a fume collector, wherein the control unit is configured to, in the manufacturing process of the lamination molded object, perform a correction of the settings related to the operation of the fume collector, depending on whether an estimated value of the parameter is in a predetermined range or not.

* * * * *